Sept. 14, 1965   J. L. LA POINTE   3,206,615
LIQUID DETECTOR DEVICE
Filed Dec. 27, 1962

INVENTOR.
JOSEPH LEO LA POINTE
BY
WILSON, SETTLE & CRAIG
ATTORNEYS

United States Patent Office 3,206,615
Patented Sept. 14, 1965

3,206,615
LIQUID DETECTOR DEVICE
Joseph Leo La Pointe, 1994 Sharon Ave., Detroit, Mich.
Filed Dec. 27, 1962, Ser. No. 247,588
6 Claims. (Cl. 307—88.5)

This invention relates to a liquid detector device, and more particularly to a normally closed sensitive semi-conductor liquid detector suitable for controlling, for example, solenoid valves which draw a relatively high load current.

The present invention is a further development of the Liquid Detector Device which I have disclosed in my copending patent application, Serial No. 247,258, filed Dec. 26, 1962.

Liquid detector devices have been proposed in the past. The prior art devices have comprised relatively complicated circuits utilizing numerous relays and electronic components. The reason for this has been that the signal or excitation current of necessity has had a relatively small value. It has therefore been necessary to either amplify the signal or to provide expensive relay circuits which can be excited by very low currents in order to drive load devices requiring, for example, up to 500 milliamps.

The present invention provides a normally closed liquid detector device of very simple circuitry but which is capable of being excited by a very small current while controlling a load requiring a relatively high current.

It is an object of the invention to provide a normally closed liquid detector device for use in connection with electrically conductive liquids, such as water.

Another object of the invention is to provide a detector which may be utilized, for example, for the control of the level, flow rate, and the like of an electrically conductive liquid.

A further object of the invention is to provide a detector utilizing semi-conductor components.

Another object of the invention is to provide a detector circuit having a highly simplified configuration.

A still further object of the invention is to provide a liquid detector device which, when excited by a relatively low value current is capable of controlling a load device drawing a relative high current.

Other objects of this invention will appear in the following description and appended claims, reference being had to the accompanying drawing forming a part of this specification wherein like reference characters designate corresponding parts in the several views.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Figure 1:
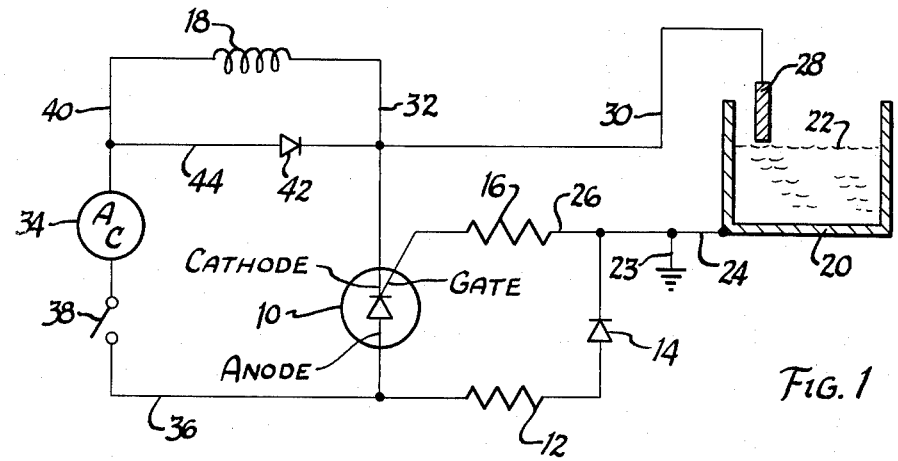
FIGURE 1 is a schematic illustration of one embodiment of the liquid detector device of the present invention.

Referring to FIGURE 1, it will be seen that the liquid detector device includes a solid state controlled rectifier 10 having a gate, cathode and anode. The gate-cathode circuit includes resistor 12, diode 14, resistor 16 and load device 18, illustrated as the coil of, for example, a solenoid valve or relay. A second circuit is provided in parallel with the gate-cathode circuit. This circuit includes container 20 of electrically conductive liquid 22, the container being connected to the gate-cathode circuit by lead 24 which extends from the container into connection with lead 26 which extends between the diode 14 and resistor 16. The second circuit also includes a probe 28 which is connected by lead 30 to lead 32 which extends between the cathode and load device 18. The container 20 is indicated as being grounded at 23. This is a normal circumstance encountered in service and has been taken into consideration in the design of the present device.

The anode-cathode circuit supplies operating current to the load device 18. The anode is connected to one side of a source of power 34 by lead 36. A switch 38 is provided in lead 36 to control the application of power to the various circuits. The lead 36 is also connected to the resistor 12 to provide power for the gate-cathode circuit. The cathode, as previously mentioned, is connected to the load device 18 by lead 32. The load device 18 is connected to the other side of power 34 by lead 40.

Figure 3:
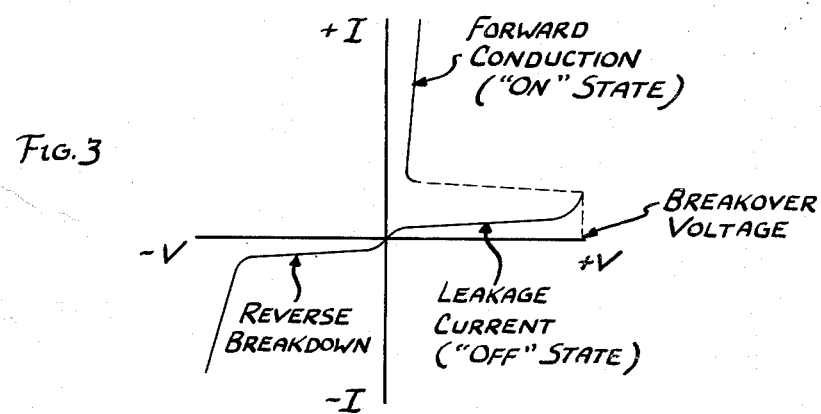
FIGURE 3 is a graph illustrating the VI characteristics of the solid state controlled rectifier of FIGURE 2.
Figure 2:
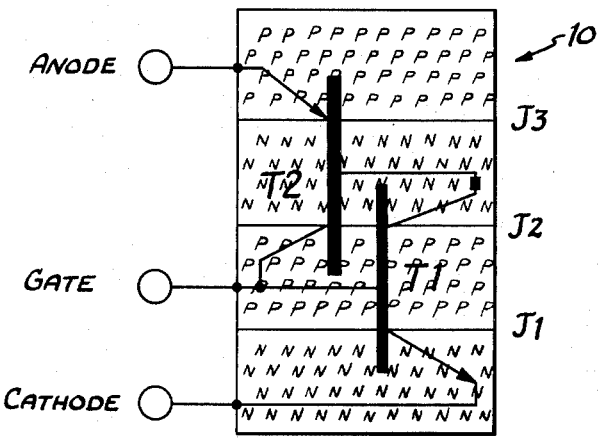
FIGURE 2 is a schematic illustration of the solid state controlled rectifier utilized in the circuit of FIGURE 1.

Operation of the controlled rectifier 10 may be understood by reference to FIGURES 2 and 3. The controlled rectifier 10 is a solid state device, for example, a silicon controlled rectifier, having both an "on" and an "off" state. The gate or switching current required is but a fraction of the total current carrying capability of the rectifier.

The rectifier is illustrated as a PNPN type. However, an NPNP type may also be utilized. The operation of the rectifier may be compared, as illustrated in FIGURE 2, to that of an NPN transistor $T_1$ directly coupled to a PNP transistor $T_2$, where the base current of $T_1$ is synonymous with gate current in the controlled rectifier. In FIGURE 2, the transistor schematic is superimposed upon a representation of the controlled rectifier PNPN junction configuration. As will be noted, the transistor junctions are aligned with the corresponding controlled rectifier junctions and the base-collector junctions of both $T_1$ and $T_2$ are in common with junction $J_2$ of the controlled rectifier. Junctions $J_1$ and $J_3$ are equivalent to the base-emitter junctions of $T_1$ and $T_2$, respectively.

In operation, since the base-collector junctions of $T_1$ and $T_2$ are common, a closed loop with gain $\beta_1\beta_2$ is formed. This closed-loop gain is the key to operation of the controlled rectifier. With $T_1$ base current at 0, loop gain will be less than one but as $T_1$ base current is increased, an increase of collector current occurs and gain increases. This process continues with an increase in $T_1$ base current until loop gain equals one. At this time, the circuit becomes self-regenerative, driving collector currents of both transistors $T_1$ and $T_2$ towards saturation. In the controlled rectifier counterpart a loop gain $\beta_1\beta_2<1$ represents the "off" state whereas $\beta_1\beta_2\geq2$ represents the "on" state.

FIGURE 3 illustrates the VI characteristic of the controlled rectifier. It will be noted that the reverse characteristic is similar to that of any diode. In the forward direction, leakage conduction (caused by collector currents of $T_1$ and $T_2$ during the period when $\beta_1\beta_2<1$) increases until the forward breakover point is reached. At this time, $\beta_1\beta_2\geq1$, so forward voltage drops to a very low level while forward current becomes essentially dependent upon load.

Referring again to FIGURE 1, it will be seen that the gate-cathode circuit is normally closed. With the switch 38 closed, current flows from the power source 34 through resistors 12, 16 and diode 14 to the gate and thence from the cathode to the load device 18 and finally to the other side of the power source 34. The rectifier 10 is thus normally triggered to the "on" condition.

The function of the resistors 12, 16 is to limit the gate current. This current desirably has a small value. The diode 14 protects the gate-cathode junction from excessive reverse bias which might cause breakdown.

When the rectifier 10 is triggered to the "on" condition, power current flows through the anode-cathode circuit to drive the load device 18. As will be noted, a diode 42 is connected across the load device 18 by lead 44. The diode 42 provides a path for current generated during off periods of the controlled rectifier. That is, in normal operation, the anode-cathode circuit conducts during only one half cycle of the applied A.C. power and ceases to conduct during the other half cycle. During the half cycle when the anode-cathode circuit is not conducting, the coil 18 will generate a current as its field decays. Such current is undesirable because it will cause chatter of the relay or solenoid. The circuit for the current generated by the coil 18 comprises lead 32, lead 40, lead 44, diode 42 and coil 18. In addition to preventing relay chatter, the diode 42, by providing a path for the current generated by the coil 18, protects the rectifier 10 from having a voltage applied to it which might cause breakdown.

The controlled rectifier 10 is turned to the "off" condition when the probe 28 touches the liquid 22. When the probe touches the liquid, the circuit in parallel with the gate-cathode circuit is closed. This circuit does not include a resistor or other current limiting device such as the resistor 16. Thus, essentially, a short circuit is provided in parallel with the gate-cathode circuit. This circuit, when closed by contact of the probe 28 with the liquid 22, reduces the gate current below that necessary to trigger the controlled rectifier 10 to the "on" condition. The gate current is thus reduced to a point where the controlled rectifier is extinguished, thus cutting off the power current to the load device 18 to discontinue operation thereof. The current flowing in the parallel circuit is insufficient to operate the load device because of the presence of resistor 12 in series therewith.

It will be appreciated that the probe 28 may be mounted in the container 20 for movement to different positions to provide different controlled liquid levels or the probe may be stationary. Additionally, in some applications, the container 20 may have an inner lining which acts as an electrical insulator to thus insulate the liquid 22 from the container. In such a case, it is necessary to directly contact the liquid with the lead 24.

Having thus described my invention, I claim:

1. A liquid detector device comprising a solid state controlled rectifier having a gate, an anode and a cathode, a source of electrical power connected between the anode and cathode and between the gate and cathode, a current limiting device in the gate-cathode circuit, a second normally-open circuit connected between the gate and cathode and in parallel with the series connection of said current limiting device and the cathode-gate junction of said solid state controlled rectifier, said second circuit including a probe and a container for electrically conductive liquid, said probe being positioned with respect to the container for contact with the liquid, said gate-cathode circuit normally conducting an excitation current sufficient to cause conduction through the anode-cathode circuit, a load connected in the anode-cathode circuit, the anode-cathode circuit supplying power to the load, contact of the probe with the liquid completing the second circuit from the cathode to the gate through the liquid and probe, closing of said second circuit being operative to decrease the gate-cathode current to extinguish the current in the anode-cathode circuit.

2. A liquid detector device comprising a solid state controlled rectifier having a gate, an anode and a cathode, a source of electrical power connected between the anode and cathode and between the gate and cathode, the gate-cathode circuit including a current limiting device and a diode to protect the gate-cathode junction from excessive reverse bias, a second normally-open circuit connected between the gate and cathode and in parallel with the series connection of said current limiting device and the cathode-gate junction of said solid state controlled rectifier, said second circuit including a probe and a container for electrically conductive liquid, said probe being positioned with respect to the container for contact with the liquid, said gate-cathode circuit normally conducting an excitation current sufficient to cause conduction through the anode-cathode circuit, a load connected in the anode-cathode circuit, the anode-cathode circuit supplying power to the load, contact of the probe with the liquid completing the second circuit from the cathode to the gate through the liquid and probe, closing of said second circuit being operative to decrease the gate-cathode current to extinguish the current in the anode-cathode circuit.

3. A liquid detector device comprising a solid state controlled rectifier having a gate, an anode and a cathode, a source of electrical power connected between the anode and cathode and between the gate and cathode, first and second current limiting devices in the gate-cathode circuit, a second normally-open circuit connected between the gate and cathode in series with said first current limiting device and in parallel with the series connection of said second current limiting device and the cathode-gate junction of said solid state controlled rectifier, said second circuit including a probe and a container for electrically conductive liquid, said probe being positioned with respect to the container for contact with the liquid, said gate-cathode circuit normally conducting an excitation current sufficient to cause conduction through the anode-cathode circuit, a load comprising a coil of an electro-mechanical device connected in the anode-cathode circuit, a diode connected across the coil to provide a path for current generated by the coil, the anode-cathode circuit supplying power to the load, contact of the probe with the liquid completing the second circuit from the cathode to the gate through the liquid and probe, closing of said second circuit being operative to decrease the gate-cathode current to extinguish the current in the anode-cathode circuit, said first current limiting device having a value sufficient to control the current in the second circuit to a point below that necessary to energize the coil to its operating point.

4. A liquid detector device comprising a solid state controlled rectifier having a gate, an anode and a cathode, a source of electrical power connected between the anode and cathode and between the gate and cathode, the gate-cathode circuit including first and second current limiting devices and a diode to protect the gate-cathode junction from excessive reverse bias, a second normally-open circuit connected between the gate and cathode in series with said first current limiting device and in parallel with the series connection of said second current limiting device and the cathode-gate junction of said solid state controlled rectifier, said second circuit including a probe and a container for electrically conductive liquid, said probe being positioned with respect to the container for contact with the liquid, said gate-cathode circuit normally conducting an excitation current sufficient to cause conduction through the anode-cathode circuit, a load comprising a coil of an electro-mechanical device connected in the anode-cathode circuit, a diode connected across the coil to provide a path for current generated by the coil, the anode-cathode circuit supplying power to the load, contact of the probe with the liquid completing the second circuit from the cathode to the gate through the liquid and probe, closing of said second circuit being operative to decrease the gate cathode current to extinguish the current in the anode-cathode circuit, said first current limiting device having a value sufficient to control the current in the second circuit to a point below that necessary to energize the coil to its operating point.

5. A liquid detector device comprising a solid state controlled rectifier having a gate, an anode and a cathode, a source of electrical power connected between the anode and cathode and between the gate and cathode, first and second current limiting devices and a diode in the gate-cathode circuit to protect the gate-cathode junction from excessive reverse bias connected between the source of power and the gate, a second normally-open circuit connected between the gate and cathode in series with said first current limiting device and in parallel with the series connection of said second current limiting device and the cathode-gate junction of said solid state controlled rectifier, said second circuit including a probe and a grounded container for electrically conductive liquid, said probe being positioned with respect to the container for contact with the liquid, said gate-cathode circuit normally conducting an excitation current sufficient to cause conduction through the anode-cathode circuit, a load comprising a coil of an electro-mechanical device connected between the cathode and the source of power, a diode connected across the coil to provide a path for current generated by the coil, the anode-cathode circuit supplying power to the load, contact of the probe with the liquid completing the second circuit from the cathode to the gate through the liquid and probe, closing of said second circuit being operative to decrease the gate-cathode current to extinguish the current in the anode-cathode circuit, said first current limiting device having a value sufficient to control the current in the second circuit to a point below that necessary to energize the coil to its operating point.

6. A liquid detector device comprising a solid state controlled rectifier having a gate, an anode and a cathode, a source of electrical power connected between the anode and cathode and between the gate and cathode, first and second current limiting devices in the gate-cathode surface, a second normally-open circuit connected between the gate and cathode in series with said first current limiting device and in parallel with the series connection of said second current limiting device and the cathode-gate junction of said solid state controlled rectifier, said second circuit including a probe and a container for electrically conductive liquid, said probe being positioned with respect to the container for contact with the liquid, said gate-cathode circuit normally conducting an excitation current sufficient to cause conduction through the anode-cathode circuit, a load connected to the anode-cathode circuit, the anode-cathode circuit supplying power to the load, contact of the probe with the liquid completing the second circuit from the cathode to the gate through the liquid and probe, closing of said second circuit being operative to decrease the gate-cathode current to extinguish the current in the anode-cathode circuit.

References Cited by the Examiner
UNITED STATES PATENTS 2,529,796  11/50  Cade _____ 328—4 X

OTHER REFERENCES

Carman: "IBM Technical Disclosure Bulletin," vol. 5, No. 4 September 1962, page 55.

"GE Controlled Rectifier Manual," first edition 1960, section 4.8, figure 4.4(B), page 45.

JOHN W. HUCKERT, *Primary Examiner.*

ARTHUR GAUSS, *Examiner.*